United States Patent [19]

Wortley et al.

[11] 4,422,171
[45] Dec. 20, 1983

[54] METHOD AND SYSTEM FOR DATA COMMUNICATION

[75] Inventors: David L. Wortley; Kenneth N. Larson, both of Thousand Oaks, Calif.

[73] Assignee: Allied Corporation, Law Department, Morristown, N.J.

[21] Appl. No.: 221,058

[22] Filed: Dec. 29, 1980

[51] Int. Cl.³ ............................................. G08C 25/02
[52] U.S. Cl. ....................................................... 371/32
[58] Field of Search ..................................... 371/32, 33

[56] References Cited

U.S. PATENT DOCUMENTS

| | | | |
|---|---|---|---|
| 3,381,272 | 4/1968 | Pasini | 371/32 |
| 3,676,846 | 7/1972 | Busch | 371/33 |
| 3,876,979 | 3/1975 | Winn et al. | 371/32 |
| 3,979,719 | 9/1976 | Tooley et al. | 371/32 |
| 4,149,142 | 4/1979 | Kageyama et al. | 371/32 |
| 4,237,338 | 12/1980 | Hecht | 371/32 |

Primary Examiner—Charles E. Atkinson
Attorney, Agent, or Firm—Joel I. Rosenblatt

[57] ABSTRACT

A method and system for communicating digital data particularly adapted for transferring large amounts of bulk data from a first station to a second station over a long propagation delay path, as for example, between first and second earth stations via a satellite repeater. The system implements a procedure or protocol which is characterized by causing the source station to continuously transmit data frames at fixed intervals, each such data frame including an identification number and an information field, generally containing a portion of a user data record. Error checking means at the destination station determines whether the data frames received thereat are error free. The destination station also continuously transmits data frames at fixed intervals substantially synchronized with the source station data frame intervals. Each data frame transmitted by the destination station may include a source station identification number and a positive or negative acknowledgement to indicate whether or not the identified source station data frame was correctly received by the destination station. The source station then interprets the destination station data frame to determine whether it is necessary to retransmit any previously transmitted data frames.

14 Claims, 10 Drawing Figures

RECEIVER STATE CHART

METHOD AND SYSTEM FOR DATA COMMUNICATION

FIELD OF THE INVENTION

The present invention relates to data communication and more particularly to a digital data communication method and system suitable for efficiently transferring large amounts of bulk data at high rates over a long propagation delay path.

BACKGROUND OF THE INVENTION

Various digital data communication systems are well known in the art. One such exemplary system is described in U.S. Pat. No. 3,979,719 to Tooley et al. Tooley discloses a multiple block binary synchronous duplex communication system in which data is transmitted in blocks including an identification code and an error checking code. Received data is checked for errors and when an error is found, the transmitting station is provided information via a return path identifying the incorrectly received data. The transmitting station retransmits the incorrectly received data when the transmitter becomes available.

SUMMARY OF THE INVENTION

The present invention is directed to an improved digital data communication method and system particularly suited for transferring large amounts of bulk data (user data records) from a first station to a second station separated by a long propagation delay path. The system can be configured to support one or more of the following transmission modes: (1) one way; i.e. bulk data flow in one direction only (2) two way simultaneous; i.e. bulk data simultaneously flowing in both directions and (3) two way alternate; i.e. the direction of bulk data flow alternates.

A system in accordance with the present invention is particularly useful in applications requiring the transfer of large amounts of data, such as business data records, between remotely located devices, e.g. central processor units, tape drives, disk drives, etc. over a long propagation delay path, such as via satellite repeater. In such applications, a significant amount of data will typically be en route between the source and destination stations, at any point in time.

In accordance with one embodiment of the invention, bulk data to be transferred is first separated into blocks of user data, each of which may, for example, contain five hundred twelve 8 bit bytes. Each such data block is then associated with certain status information and formatted into a data frame. The first or source station continuously transmits the formatted data frames, each within a fixed time interval. The status information typically contained within each data frame includes a block identification number which uniquely identifies the data frame, a sync sequence code used to establish synchronization, and an error detecting code. The second or destination station also continuously transmits formatted data frames having fixed intervals substantially synchronized with the source station data frame intervals. A data frame transmitted by the destination station may include a source station block identification number and a positive or negative acknowledgement associated therewith to indicate whether the source station data frame was correctly received by the destination station. The source station maintains a list of block identification numbers indicating data frames that have been transmitted. Upon receipt of a positive acknowledgement, the related identification number may be dropped from the source station list. If, however, the source station does not receive a positive acknowledgement as to any identification number on the list, the source station then makes a decision as to whether or not to retransmit the identified frame. It is an objective of the present invention to minimize the number of retransmissions required in order to maximize data throughput.

The embodiment disclosed herein will be primarily discussed with reference to two way simultaneous communication between first and second stations. In order to facilitate understanding, however, the first and second stations may sometimes be respectively referred to as "source" and "destination" stations. However, it should be understood that these functional terms only define the functions performed by the stations with respect to a particular data block and that in a two way simultaneous system, each station simultaneously functions as both a "source" station to transmit data to and a "destination" station to receive data from, the other station.

In accordance with the disclosed embodiment, the block identification numbers are generated in numerical sequence by the source station and assigned to new data blocks in sequence. Each data block and its block identification number are respectively incorporated into the information and header fields of a data frame just prior to transmission. The source station maintains a list (transmit list) of block identification numbers in order of transmission. Identification numbers are dropped from the list upon receipt of confirmation that the data frame was correctly received at the destination station.

In accordance with a significant feature of the invention, the destination station maintains a history count indicative of the number of data frames it has received correctly since the last incorrectly received data frame. This history count is included in the data frames transmitted from the destination station to the source station to assist the source station, when it fails to receive a positive acknowledgement, in determining whether a data frame was correctly received by the destination station.

In accordance with the disclosed embodiment of the invention, compatible data frame formats are utilized by the first and second stations which formats include data originating at that station as well as acknowledgement information concerning data originating at the other station.

In accordance with the disclosed embodiment, data frame transmission rates are substantially the same for both stations but the number of bits in a data frame transmitted from the destination station may be less than the number of bits in a data frame transmitted from the source station to permit more efficient bandwidth utilization.

DETAILED DESCRIPTION

The detailed embodiment disclosed herein comprises an exemplary embodiment of the invention and it will be apparent to those skilled in the art that many changes and modifications may be made without departing from the basic teachings of the invention. Accordingly, the disclosed embodiment should be understood as being only representative and providing a basis for the claims which define the scope of the present invention.

Figure 1:
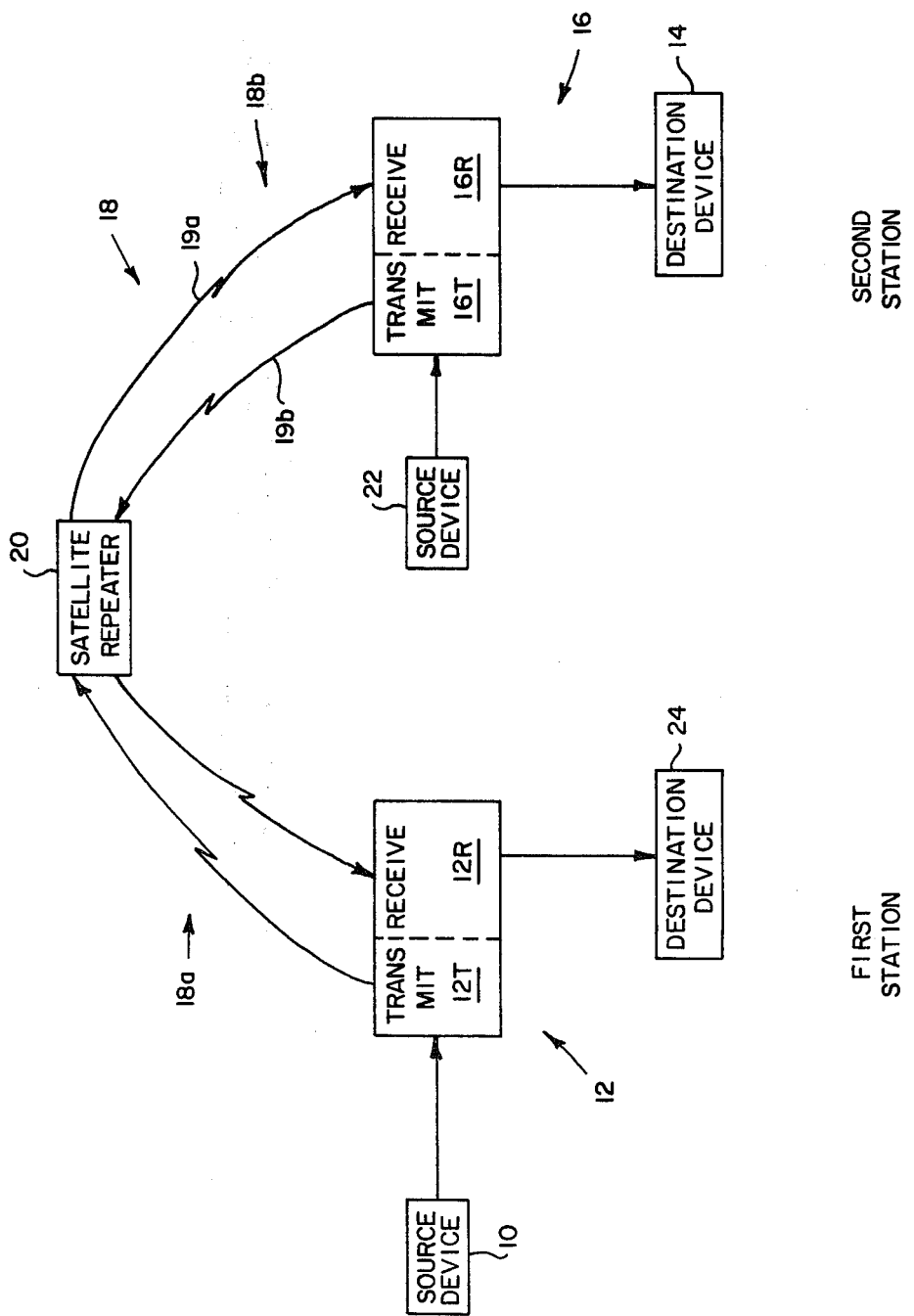
FIG. 1 is a block diagram showing two ground stations in communication with each other through a satellite repeater.

Attention is initially directed to FIG. 1 which generally depicts a digital communication system particularly suited for utilizing the teachings of the present invention. More particularly, FIG. 1 depicts a system for transferring digital data from a source device 10, e.g. a central processing unit, tape drive or disk drive unit, at a first station 12, to a destination device 14, e.g. central processing unit, tape drive or disk drive unit, at a second station 16, via a long propagation delay path 18. The path 18 may include a satellite repeater 20 which accepts signals from station 12 via path 18a and beams the same signals via path 18b toward station 16. Although the satellite repeater 20 can support many distinct communication channels, the description herein will be concerned with only two such channels; i.e. one in each direction 19a and 19b.

In the embodiment disclosed herein, the two stations 12 and 16 shall be considered identical, each including a transmit section, 12T and 16T, and a receive section, 12R and 16R. Both stations, 12 and 16, have source devices, 10 and 22, and destination devices 24 and 14, respectively associated with them. Although the respective stations may sometimes herein be referred to as "source" and "destination" stations, it should be understood that these functional terms only define the functions performed by the stations with respect to a particular data block and that each station may concurrently function as both a source station to transmit data to the other station and a destination station to receive data from the other station.

The system of FIG. 1 is intended for transferring large amounts of data, e.g. business data records, as from source device 10 to destination device 14. Because of the long propagation delay associated with path 18, a significant amount of data may be in the air at any point in time; i.e. en route from one station to another. Noise bursts or other factors may introduce bit errors in transmission of data between the stations. In accordance with the invention, these errors are monitored and when detected cause the source station, under certain circumstances, to retransmit the data frames erroneously received by the destination station.

The system in accordance with the present invention efficiently keeps track of the data transmitted so that only a minimum amount of data need be retransmitted, thereby maximizing the system throughput. The teachings of the invention are compatible with communication systems employing several different transmission modes; e.g. one way, two way alternate, and two way simultaneous. The detailed embodiment disclosed herein is capable of operating in a two way simultaneous mode. However, to facilitate understanding, the explanation herein may in places ignore transmissions originating at station 16 and assume that all transmissions originate at station 12 with station 16 responding with acknowledgement information. Thus, station 12 will, for purposes of explanation, generally be viewed as the destination station.

Prior to discussing the detailed embodiment, the operation of a basic system as depicted in FIG. 1, in accordance with the present invention, will be briefly considered. The source station 12 accepts bulk data from source device 10 and separates it into manageable data blocks, each of which may, for example, contain five hundred twelve 8 bit bytes. Each such data block is then incorporated into a data frame formatted by the source station prior to transmission over the path 18a. Data frames are continuously transmitted by the source station 12 at fixed intervals.

In formatting data frames, the source station generates block identification numbers in numerical sequence and assigns each such identification number to a new data block. Each data block and its associated identification (sequence) number is respectively incorporated into the information and header fields of a data frame prior to transmission. Additionally, the source station incorporates an error checking code, e.g. a cyclic redundancy code (CRC) into each data frame. The source station maintains a list (transmit list) of block identification numbers in order of transmission identifying data frames whose acceptance by the destination has not yet been confirmed. The information field within each data frame, as distinguished from the block identification number, is retained in a buffer memory (not shown in FIG. 1) at the source station and this information field can be accessed using the block identification number as a pointer or indirect address.

The destination station 16 performs an error check (utilizing the CRC) on all received data frames. The destination station accumulates a list (receive list) of block identification numbers in numerical order identifying correctly received data frames. The received data frame information can be stored in a buffer memory (not shown in FIG. 1) at the destination station and can be accessed using the block identification numbers in the receive list as pointers or indirect addresses.

If a current data frame is correctly received at the destination station and if all numerically prior data blocks were previously received, then the current block identification number can be dropped from the receive list and its associated data block can be released from the buffer memory to the destination device 14. If, however, there is a gap in the numerical sequence of correctly received data blocks, then the current correctly received block identification number is stored in the receive list and its corresponding data block stored in the buffer memory and not released to the destination device 14 until the data blocks identified by the missing block identification numbers are correctly received. Thus, data is released to the destination device only in the same order as received from the source device.

The destination station 16 continuously transmits data frames at fixed intervals substantially corresponding to the data frame transmissions from the source station.

The data frames transmitted by the destination station are formatted essentially identically to the data frames transmitted by the source station. The destination station produces either a positive acknowledgement (ACK) or a negative acknowledgement (NAK) for each data frame received to respectively indicate whether that data frame was correctly or incorrectly received. These acknowledgements are incorporated into the header of data frames formatted by the destination station.

The source station, upon receiving the acknowledgement information from the destination station, then determines whether the indicated block identification number can be dropped from its transmit list and the related frame information deleted from its buffer memory. That is, when a positive acknowledgement is received by the source station with respect to a particular block identification number, it will be dropped from the transmit list and the associated data block will be deleted from the source station buffer memory. Since one frame is received for each frame transmitted, the identification number of the block being acknowledged is typically the oldest entry in the transmit list.

On the other hand, a negative acknowledgement received by the source station, does not update the transmit list. A decision is later made by the source station that the frame must be retransmitted.

Thus, from what has been said so far, it will be recognized that the identification number of each block transmitted by the source station will be retained in the source station transmit list until the source station receives confirmation that the data frame block was correctly received by the destination station. Confirmation can be indicated either by a positive acknowledgement or an appropriate history count received at the source station. In the absence of a confirmation that a data block was correctly received by the destination station, the source station will retransmit the unconfirmed data block.

In accordance with a feature of the preferred embodiment, when it is necessary to retransmit a data block, the same data block is retransmitted by the source station a multiple number of times, e.g. in three successive frames, in order to considerably increase the likelihood that on retransmission the data block will be correctly received. That is, since the destination station will not release data frames to the destination device 14 out of sequence, and since the destination station receive list and buffer memory must hold all data block identification numbers and information fields with respect to frames following an incorrectly received frame, it is desirable to assure with a high level of certainty that a retransmitted data block will be correctly received.

Prior to proceeding with a detailed explanation of the data frame format and the configuration of the transmitter and receiver portions of each station, it is again pointed out that in a preferred system in accordance with the invention, the two stations are identical and each is simultaneously acting as both a source and destination station. As was previously mentioned, the stations have been referred to as "source" and "destination" stations to facilitate an understanding of the system, but these terms only refer to the function performed by the stations with respect to a particular data block. Thus, for a data block being transferred from source device 10 to destination device 14, station 12 will be the source station and station 16 will be the destination station. However, for a data block being transferred from source device 22 to destination device 24, station 16 will be the source station and station 12 will be the destination station. Moreover, in accordance with the invention, a data frame format is utilized which accommodates both source and destination information. Thus, for example, the first station 12 will transmit data frames which include a block identification number and a data block to be transmitted. Additionally, the same data frame will include within its header field acknowledgement information together with a block identification number relative to a data frame previously transmitted by the station 16. Likewise, each data frame transmitted by the station 16 typically includes both source and acknowledgement information. At any point in time, source data may be flowing in one or both directions. However, regardless of whether source data is flowing in one or both directions, both stations continually transmit and receive data frames.

Figure 2:
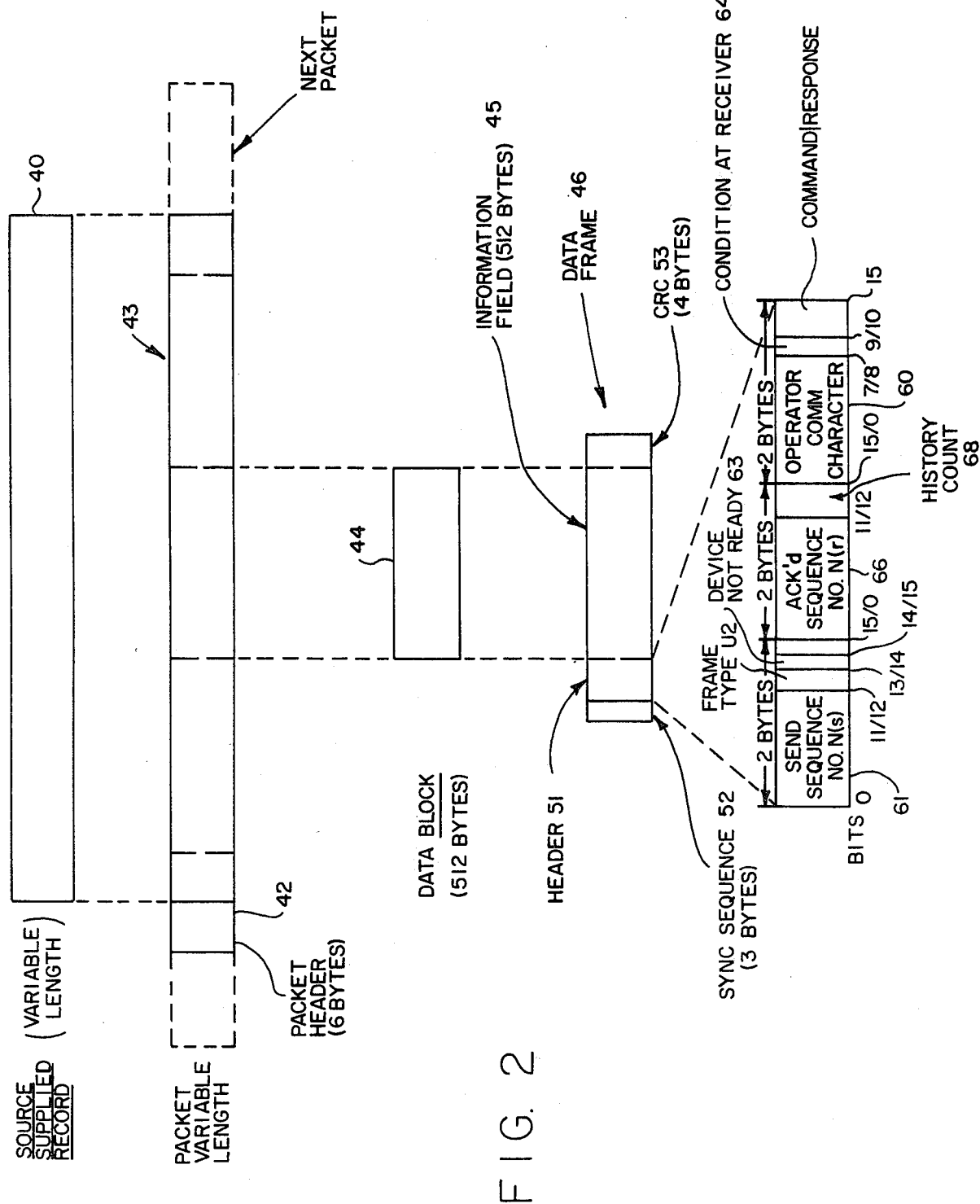
FIG. 2 is a diagram depicting how a data frame is formatted in accordance with the disclosed embodiment of the invention.

Attention is now directed to FIG. 2 which depicts how a variable length data record 40 supplied by a source device 10 or 22 is embedded into data frames transmitted between stations over path 18. The record 40 may be simply considered as comprising a bit stream of variable, but finite length, such as may be derived from a magnetic tape. In order to mark the limits of the record, packet header information 42 is appended thereto and the combination is referred to as a packet which also may be viewed as merely comprising a user bit stream to be transmitted from one station to the other. This bit stream, formed from one or successively formed packets, is in turn divided into blocks 44 of data of uniform length (e.g. five hundred twelve 8 bit bytes), and each data block 44 is then embedded in the information field 45 of a data frame 46. Thus, an information field 45 can contain both record data and packet header information 42. In addition to an information field 45, each data frame 46 includes a six byte (72 bit) frame header 51 a three byte (24 bit) sequence code 52 used for synchronization purposes, and a four byte (32 bit) cyclic redundancy code (CRC) 53 for error detection. The synchronization sequence code chosen for the exemplary embodiment consists of twenty four bits corresponding to 111110101111001100100000. The frame header 51 is used for transmission of real time data such as acknowledgements, block identification (sequence) numbers, etc. As such, frame headers are not stored or retransmitted. They are generated by the station transmitter section when the frame is formatted immediately prior to being transmitted, and are discarded once the information embedded therein is pulled out by the station receiver section.

The primary characteristics of the communication protocol in accordance with the invention are as follows:
(a) Character Oriented (no bit stuffing)
(b) Data transparent, including capability to support bit stream transmission
(c) Continuous transmission permitted with outstanding NAK's limited only by available buffer size and sequence number word length
(d) Frames are sent at fixed intervals with constant frame length
(e) Frames are of fixed lengths which may be selectable under program control, but typically:
  4,096 bits data + 104 bits overhead = 4,200 bits total
(f) Frames are of two types:
  Information Frames (IF's): contain a header and a short or full data block. A short data block is selectable up to 32 bytes in length followed by idle characters to fill the remainder of the information field. A full data block is the same length as the information field.

Non-Information Frames (NIF's): contain a header and a dummy information field.

(g) The frame header includes a dedicated eight bit byte to support operator communication.

(h) The frame format is:

| 3 bytes | 6 | typically* 512 | 4 | = 525 bytes |
|---|---|---|---|---|
| SYNC SEQ | HEADER | INFORMATION | CRC | |

*The length of the information field may be selectable under program control.

(i) The header format is:

| 2 bytes | | 2 bytes | | 2 bytes | |
|---|---|---|---|---|---|
| SEND SEQUENCE NUMBER-N(s) | DATA TRANSFER CONTROL | ACK'd SEQUENCE NUM N(r) (IF ANY) | HISTORY COUNT | OPERATOR COMM CHARACTER | LINK CONTROL CMDS/RESP |
| 0          11 | 12      15 | 0          11 | 12      15 | 0        7 | 8        15 |

(j) The frame header is used for transmission of "real time" data, i.e. ACK's, NAKs, commands, etc. As such, headers are not stored or retransmitted. They are generated by the transmitter immediately before the frame is transmitted and are discarded once all required data is pulled out of it by the various receiver functions.

(k) The receiver performs a 32-bit CRC check on all frames to assure that only correctly received data is accepted.

(l) The receiver provides an interrupt each time a frame is received or should have been received and guarantees that no frame can be lost without at least a single interrupt indicating a bad or missing frame.

(m) The operator communications character is pulled from all headers whether the frame was accepted by the CRC or not.

(n) A simple protocol is provided to request retransmission of operator messages which contain errors (errors are determined by a simple cummulative Exclusive-OR check).

(o) An ACK must be returned for each frame sent, however:

A history count, h, is sent along with each ACK returned from the receiver back to the originating transmitter to indicate the number of frames (up to 16) correctly received since a bad frame. If previous frames containing ACK's were lost, the transmitter may release the data associated with the h frames preceding the frame just ACK'd even if no specific ACK was received for these frames.

(p) Differences in transmission rates between the transmit and receive links are compensated for as follows:

Transmit path slower than receive (return) path (more frames received than sent):

The list of ACKs and NAKs to be sent back to the originating transmitter will periodically be empty. The frame sent at these times will contain a NOP (no operation) response in the ACK/NAK condition field. This indicates that no action should be taken in the transmit list as a result of this response.

Receive path slower than transmit path (more frames transmitted than received):

The list of ACKs and NAKs to be sent back to the originating transmitter will fill the list to the length provided and periodically an ACK or NAK response will be dropped. If a NAK is dropped, the transmitter will retransmit the block as soon as the next ACK is received. If an ACK is dropped, its disappearance will be made up by application of the history count.

(Differences in transmit and receive rates can be caused by bit slips due to minor differences in the clock generator at the two stations or to different send and receive rates being compensated by adjusting the bit length of returned frames).

(q) The link may operate in [one way, two way alternate (TWA) [or two way simultaneous (TWS) transmission modes depending on the needs of the devices being supported and the amount of buffer memory available.

(r) One-way or [TWA] mode is implemented by using frames containing full data blocks to transfer bulk data. Frames containing short data blocks are used for transferring status information back from the destination device to the source device. Upon link turnaround, the block sizes are switched to allow bulk data to flow in the opposite direction. Short and full data blocks are never intermixed on the same transmission direction.

(s) [TWS mode is implemented by transmitting frames containing full data blocks in both directions.]

(t) If no data is available to transmit, a noninformation frame (NIF) will be sent. In a NIF, only the header information is valid. The physical frame contains a dummy information field which is discarded at the receiver.

(u) Exception conditions are handled in one of three ways:

K-copy Recovery—If the transmitter determines the receiver has lost a frame, it will retransmit K-copies of that frame (K=3).

Single-copy Recovery—If the receiver was unable to accept a frame due to buffer overflow, single copies of the frames not accepted will be retransmitted.

Reinitialization Recovery—If more than ten frames times elapse and no frame is correctly received, then single copies of all un-ACK'd frames will be retransmitted until synchronization is regained.

(v) All data blocks are assigned a block identification (sequence) number the first time they are transmitted. On all subsequent transmissions, the same sequence number will be used.

(w) NIF frame headers do not contain a sequence number since they do not carry a data block. (The send sequence number field and the information field exist in the physical frame but they are unused.)

(x) Sequence numbers for data blocks are modulo 4096.

(y) The following commands are provided:
Transmitter—(indicate frame type)
IF—Information Frame
NIF—Noninformation Frame
Receiver—(indicates conditions)
ACK N(r)—Acknowledge N(r)
NAK—Frame not received or bad BO N(r)—No room for frame N(r) in buffer
(NOP)—Inserted to indicate no ACK, NAK or BO was available for transmission.

It should be noted (FIG. 2) that the frame header 51 is comprised of three major two byte fields. The first two byte field is primarily used for source station information such as the frame identification (sequence) number, frame type etc. The second two byte field is primarily used for destination station information such as acknowledgement and history count information. The third two byte field is primarily used for real time communication between operators at the two stations and higher level link control. More particularly, bits 0-7 of the third field can contain an operator communication character 60. Use of this character 60 is intended to permit communication between station operators in real time and thus the character 40 is pulled from the header 51 when received at the destination station regardless of whether the frame passes the CRC error check. Thus, the data format depicted yields a full communication subchannel.

The first two byte field of header 51 contains, in bits 0-11, the "send sequence number" N(s), 61 which is the identification number previously referred to which uniquely identifies the frame being transmitted. The sequence number N(s) is transmitted only as part of information frames (IF) and not as part of noninformation frames (NIF).

Bits 12-15 of the first two byte field are used to control data transfer and more specifically to define the frame type, i.e. bit 12 indicates whether the frame is an IF or NIF, indicates whether the related information field 45 is being originally transmitted or retransmitted, and bits 14, 15 indicate whether the receiver section of the source station is ready to receive.

The second two byte header field carries information relative to the stations destination function. That is, bits 0-11 carry the frame sequence number N(r) of a data frame being acknowledged. More particularly, if the receiver section of station 12 determines that a received frame passes the CRC error check, then that frame is ACK'd by incorporating its sequence number 66 into bits 0-11. Bits 12-15 contain a history count which is transmitted with each ACK to indicate the number of frames (up to sixteen) correctly received subsequent to the last frame that did not pass the CRC check. Thus, if a frame containing an ACK is garbled during transmission, the history count in a later frame can be utilized by the source station to determine whether a previously unconfirmed frame was correctly received by the destination station.

Bits 0-7 of the third two byte field of header 51 are used for the operator communication character 60, already discussed. Bits 8 and 9 are used to designate a condition at the receiver section of the station generating the data frame 46. Thus, bits 8 and 9 indicate the following conditions:

0,0 = indicates a positive acknowledgment (ACK) for frame sequence number N(r).

0,1 = indicates a negative acknowledgment 1,0 = indicates a buffer overflow (BO); i.e. there was no available space in the receiver section buffer memory to accommodate the information field of frame N(r).

1,1 = indicates no operation (NOP); i.e. neither an ACK, NAK or BO condition existed.

Bits 10-15 of the third byte are used for command/response purposes to establish and control linking of the stations.

The NOP data frames function to compensate for differences in transmission rates which may occur between the first and second stations due to bit slips attributable to minor differences in clocking rates between the two stations. That is, it will be recalled that the disclosed system contemplates that both the first and second stations continuously transmit data frames at fixed intervals. If the transmission rate of the first station becomes slower than the second station, for example, the second station will receive fewer data frames than it sends. As a consequence, its list of ACK and NAKs, to be discussed hereinafter, will periodically be empty. Thus, a NOP data frame will be sent by the second station when its ACK/NAK list is empty. This indicates that no action should be taken by the first station in response to this data frame. If on the other hand, the transmission rate of the first station is greater than the second station, the ACK/NAK list at the second station will occasionally overflow and ACK or NAK responses will be dropped. If a NAK is dropped, the first station will, in due course, retransmit the related data frame since it will not have received confirmation that the frame was correctly received by the second station. If an ACK is dropped, a subsequently transmitted history count will confirm the correct receipt of the released data frame.

Figure 3:
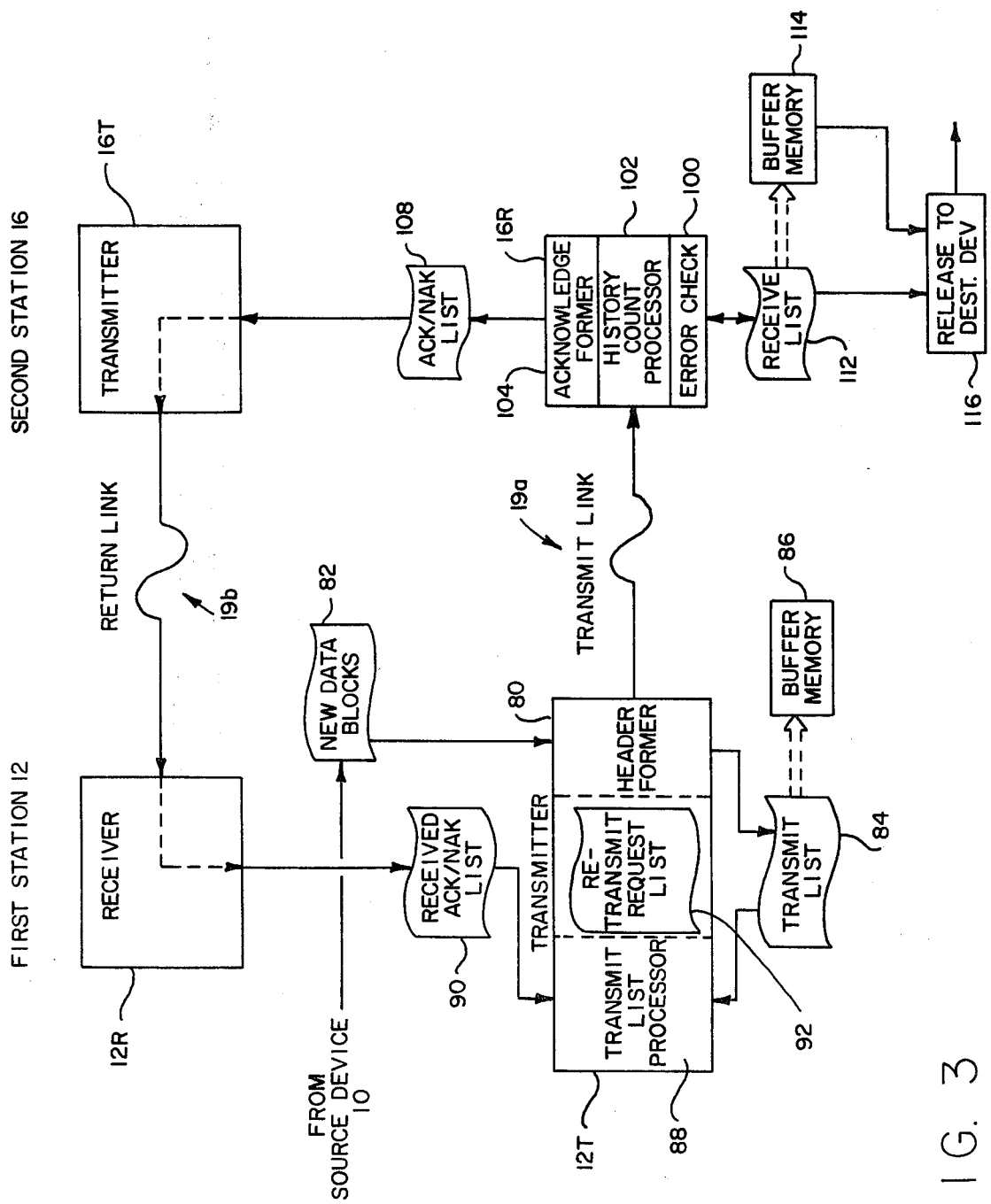
FIG. 3 is a block diagram depicting the major functional sections of the stations of FIG. 1.

Attention is now directed to FIG. 3 which depicts the major functional sections of stations 12 and 16 assuming that they are respectively functioning only as source and destination stations. From what has been said previously, however, it should be understood that both stations 12 and 16 function as source and destination stations and thus station 12 also will include the various elements depicted for station 16 and station 16 will include the various elements depicted for station 12.

More particularly, station 12 includes a transmitter section 12T and a receiver station 12R. Station 16 similarly includes a transmitter section 16T and a receiver section 16R. Transmitter section 12T communicates over a transmit link or channel 19a with receiver section 16R and transmitter section 16T in turn communicates over a return link or channel 19b with receiver section 12R.

The transmitter section 12T has associated with it several major elements illustrated in FIG. 3. Initially, the transmitter section 12T includes a header former unit 80 which functions to form the header 51, previously discussed in connection with the FIG. 2. New data blocks accessed from list 82 are incorporated into the information field of a data frame and associated with a header 51 formed by header former unit 80 and then transmitted over channel 19a to the receiver section 16R. The new data block list of memory P2 is loaded from the aforementioned source device 10 by a suitable control means (not shown) whose characteristics are not critical to the present invention. It will be assumed that so long as there is data to be transmitted, data blocks will be available from memory 82 and will thus cause the transmitter section 12T to transmit an information frame (IF). In the event data blocks are not available from memory 82, then the transmitter section 12T will transmit a noninformation frame (NIF) in which the information field will be filled with filler information.

In addition to the header former unit 18 and data block memory 82, a transmit list 84 is associated with the transmitter section 12T. The transmit list 84 which can physically comprise any suitable memory, is used to store identification numbers of data frames recently transmitted by the transmitter section and not yet acknowledged by the receiver section. The header former unit 80 forms a new header for each data frame transmitted. Each new header of course contains a block identification number and it is this block identification number which is stored in the transmit list 84 at time of transmission. A buffer memory 86 is associated with the transmit list 84 and is used to hold the information fields of transmitted data frames until confirmation is obtained that the data frame was correctly received at the destination station. The physical characteristics of the buffer memory 86 are not critical to the present invention. It should suffice to understand that as each data frame is formed, its information field will be stored in the buffer memory in a location which can be accessed by utilizing the related block identification number which is retained in the transmit list 84. Thus, the block identification number can comprise a direct or indirect address to access the related information field.

Also associated with the transmitter section 12T is a transmit list processor 88. The transmit list processor receives inputs from the transmit list 84 and from a received ACK/NAK list 90. The list 90 comprises a memory which is loaded by the receiver section 12R with acknowledgment information received via channel 19b from the second station transmitter section 16T.

The transmit list processor 88 determines, in accordance with criteria to be discussed in greater detail hereinafter, when a identification number in the transmit list 84 should be dropped therefrom. Briefly, if that identification number is positively acknowledged, i.e. an ACK is received therefor, then the identification number is dropped from the transmit list 84.

The transmit list processor 88 controls a further major element of the transmitter section 12T comprising the retransmit request list 92. The list 92 also comprises a memory which, in this case, is loaded by the transmit list processor with block identification numbers from the transmit list 84 identifying those data frames whose data blocks require retransmission. In order to retransmit a data block, it is actually incorporated in a new data frame in that a new header is formed by header former unit 80 and incorporated into a new data frame with its original block identification number.

In discussing the function of the header former unit 80 of the first station 12 operating only as a source station, it should be understood that the header former unit 80 functions to form the first two byte field of the header 51 described in connection with FIG. 2. That is, it will be recalled that the first two byte field of the header 51 relates primarily to the source function of the station in that it includes the frame identification or send sequence number N(s) and the frame type. The second two byte field of the header 51, as depicted in FIG. 2, is used where the station is operating as a destination station. Although it should be understood that both stations 12 and 16 concurrently operate as source and destination stations, the simplified illustration in FIG. 3 assumes that station 12 is operating only as a source station while station 16 is operating only as a destination station.

The receiver section 16R of station 16 functions in part to form the second two byte field of the header transmitted by its associated transmitter section 16T. That is, it will be recalled that the second two byte header field is used to carry the frame sequence number N(r) of a data frame being acknowledged and also a history count used to indicate the number of frames correctly received subsequent to the last frame incorrectly received.

The receiver section 16R includes several major components including an error check unit 100, a history count counter 102, and an acknowledgment former unit 104. The error check unit 100 examines data frames received via channel 19a and determines, in accordance with well known error checking techniques, utilizing the CRC bits, whether a received data frame is error free. The history count counter 102 responds to the determination made by the error check unit 100 and maintains a count of successive correctly received frames. The acknowledgment former unit 104 is responsive to both the error check unit 100 and the history count counter 102 to form that portion of the header 51 (FIG. 2) required to transmit information from the destination station to the source station. More particularly, the unit 104 forms the second two byte field of header 51 including the identification or sequence number N(r) of a data frame being acknowledged and the history count. The field formed by unit 104 is loaded into an ACK/NAK list 108. The list 108 comprises a memory which can be accessed by the transmitter section 16T to form the header 51 of a data frame being transmitted via channel 19b to station 12.

Also associated with the receiver section 16R is a receive list 112, which comprises a memory used to store the block identification numbers of correctly received data frames. The receive list 112 is associated with a buffer memory 114 which is used to store the information fields of correctly received data frames. The buffer memory 114 is organized such that the information fields stored therein can be accessed, either directly or indirectly by the related block identification numbers stored in the receive list 112. Identification numbers are retained in the receive list if they identify a correctly received frame and if they follow at least one frame which has not yet been correctly received. More particularly, it will be recalled that the system functions to release the bulk data or information fields to the destination device 14 (FIG. 1) in the same sequence in which they were transmitted. Thus, even though a data frame is correctly received, if all prior data frames have not yet been correctly received, the later correctly received data frame will not be released to the destination device 14. Rather, its identification number will be retained in the receive list 112 and its information field will be retained in the buffer memory 114. When the missing data frames are correctly received, then the receiver station 16R can release the data frames, or more correctly information fields at this point, to the destination device 14 in correct sequence. The receiver section 16R controls a list 116 of data frames ready for release to the destination device 14. The block identification numbers in the list 116 can be used as direct or indirect addresses to access their related information fields from the buffer memory.

In the foregoing description of the block diagram depicting the major elements of the source station transmitter section 12T and destination station receiver station 16R, reference was made to several different memories and lists. It should be understood that although it is easier to think of these various memories and lists as being separate, such lists and memories common to a single station, for example, could actually be contained within one physical memory, if desired. Thus, it should be understood that the blocks depicted in FIG. 3, although intended to depict separate functional units, are not intended to necessitate separate physical units.

For convenience, the characteristics of the transmit, receive and ACK/NAK lists are summarized as follows:

TRANSMIT LIST CHARACTERISTICS

The transmit list is organized as a first in, first out (FIFO) memory ordered exactly as the frames are transmitted. As new data blocks are transmitted, they are assigned a sequence number N(s) which is entered at the top of the list with the rest of the list shifting down one position. Sequence numbers being ACK'd are at bottom of the list and are dropped when ACK'd. Entries for blocks which must be retransmitted are removed from the transmit list and placed at the top of the retransmit list.

Each entry in the list contains the following information
Sequence number N(s)—12 bits (not used if NIF)
Base Address—21 bits (not used if NIF)
Status—4 bits
Not retransmitted/Retransmitted/Retransmitted twice—2 bits
ACK'd/Not ACK'd—1 bit
Information/Noninformation—1 bit
Copy count—8 bits
(Count is three for retransmitted blocks and as required for consecutive noninformation frames sent)

The nominal length of the list is $2P_d$ (where $P_d$ is the propagation path delay between stations) entries plus some delta. The delta represents the processing delay attributable to both stations, in frame times.

RECEIVE LIST CHARACTERISTICS

The receive list is organized as a modified FIFO memory ordered sequentially based on sequence number. The bottom of the list contains the oldest entry.

If blocks arrive out of order, entries will have been left open in the list for them. Each entry is associated with a base address in physical memory such that when a block does arrive it is placed in the memory location associated with that entry, rather than at the top; thus the list is a modified FIFO.

The bottom of the list points to an incorrectly received block. When this block is correctly received, all blocks up to the next incorrectly received block are handed off to the destination device.

If no bad frames are received, the receive list will be empty.

Each entry contains the following information:
Base Address—21 bits
Status—1 bit
Received/Not received—1 bit The receive list may have as many entries as there are data frames in the receive buffer.

ACK/NAK LIST CHARACTERISTICS

The ACK/NAK list is the mechanism for transferring data between the receive and transmit sections of each station. Each entry contains the following information:
HEADER the orginal frame header exactly as received (six bytes)
STATUS an indication of the validity of the header as determined by the receiver section (two bits)
CRC Good—(termed a GOOD header)
CRC Bad—(termed a BAD header)
HISTORY COUNT inserted by the receiver to indicate the number of information frames (up to 16) which have been correctly received since the last incorrectly received frame (four bits)
CONDITION—the remote receiver's condition in response to receiving a frame—ACK, NAK or BO (two bits) The list will have a maximum number of entries, one less than the number of entries which will be searched for in the transmit list.

RETRANSMIT REQUEST LIST CHARACTERISTICS

The retransmit request list is a FIFO and contains entries for those blocks which need to be retransmitted. The format of the entries is identical to those on the transmit list. The oldest entry awaiting retransmission is at the bottom of the list. New entries are added at the top. Note that for a complete reinitialization recovery, all entries on the transmit list are moved to the retransmit request list.

Figure 5:
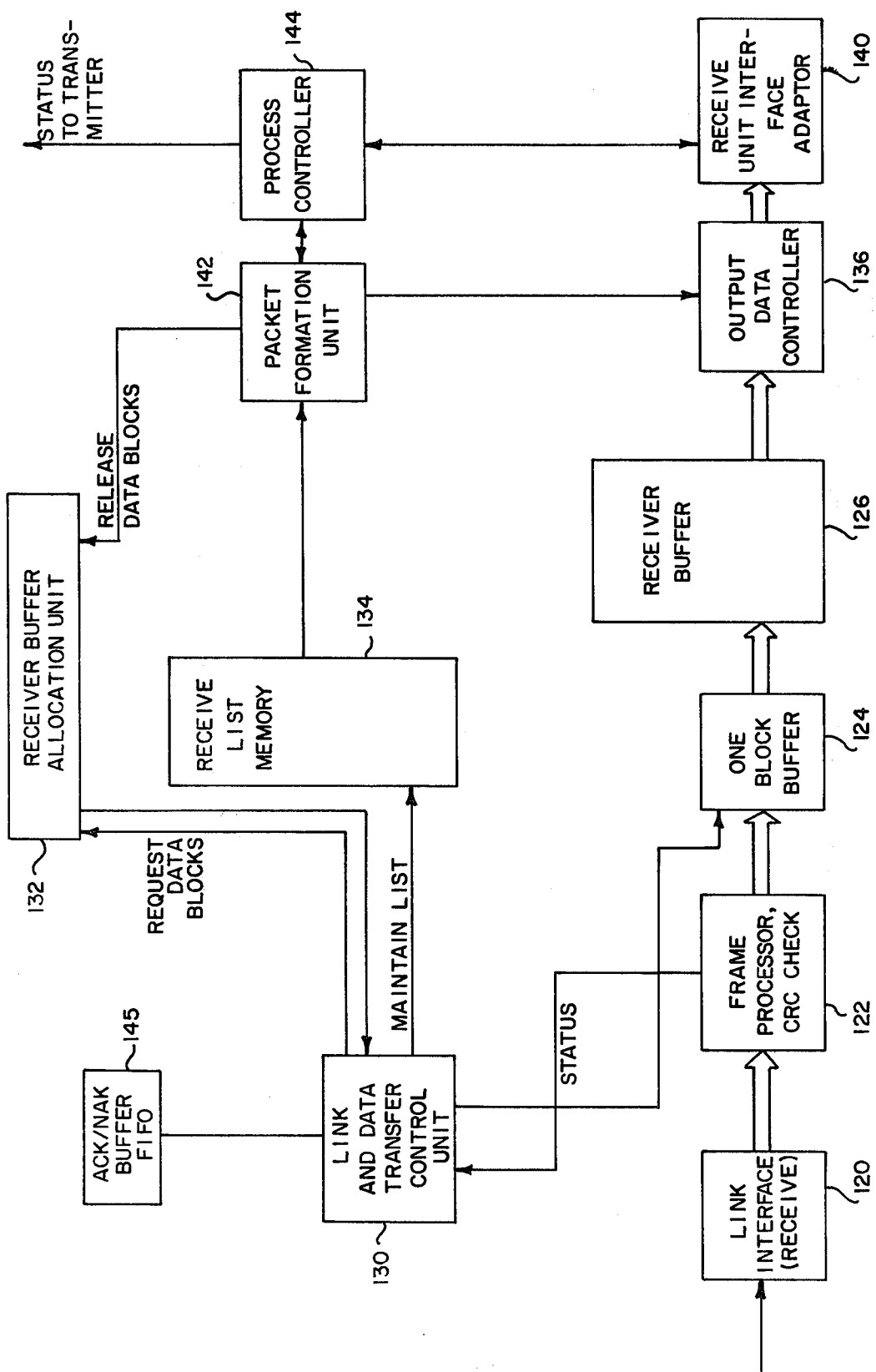
FIG. 5 is a block diagram of the receiver portion of each station shown in FIG. 1.

Prior to discussing the details on the transmitter and receiver sections in connection with FIGS. 5 and 6, a typical operational sequence for the system of FIG. 3 will be explained. For simplicity in explanation, the movement of user data and acknowledgment information around the system of FIG. 3 will be explained in terms of half duplex operation with user data flowing only from station 12 to station 16.

As previously mentioned, however, a typical use of the system would involve full duplex operation with new data to be transmitted originating at both stations. Thus, each function described for the first station 12 would also be occurring at the the second station 16; and each function for the second station 16 would also be occurring in the first station 12.

In order to understand the operational sequence, assume now that the communication link between stations 12 and 16 has been established and the new data list 82 contains data to be transmitted.

STATION 12—TRANSMITTER ACTIONS

The transmitter 12T is tasked with tracking all the blocks through the system and deciding on the appropriate recovery technique when required. The first priority of the header former unit 80 is to transmit data blocks from retransmit request list 92, (data blocks requiring retransmission). Next in priority are blocks of data on the new data list 82. If there are no data blocks to be sent, then the header former unit will transmit NIF's. In this example, no entries exist in the retransmit request list 82 because it is assumed that the link has just been established. Thus, the header former unit 80 will begin producing headers for the data blocks on the new data list 32. An entry is made in the transmit list including a copy count of one indicating that one copy is being sent. Each header will be assigned the next sequential block sequence number. Additionally, the operator communications character, ACK/NAK status information, and bit control commands will also be incorporated into the header, all as depicted in FIG. 2. When each header is complete, the updated new data list entry will be moved from the new data list 82 to the top of the transmit list 84. For each data frame transmitted, the three byte sync sequence number 52 is first sent followed by the six byte header 51, the 512 byte information field 45 and then the four byte CRC code 53.

STATION 16—RECEIVER ACTIONS

The receiver section 16R locates the sync sequence number, stores the header and information field and then checks to see if the CRC check is good. If the incoming frame did not pass the CRC check, the receiver 16R will place a NAK indication in the ACK/NAK list 108. The operator communication character is pulled from the header and sent to an operator communications processor. In addition, the history count is reset to zero as a result of the NAK indication. If the frame passes the CRC check, the receiver 16R determines if the frame is a NIF. If not, the sequence number is separated from the header and inserted into the appropriate position in the receiver list 112, and ACK N(r) is placed in the ACK/NAK list 108 and the history count is incremented by one (where N(r) is the block identification number of the block received). If there is no memory available in the receive buffer memory 114, a buffer overflow (BO) N(r) will be placed in the ACK/NAK list 108. The history count will be incremented unless a received frame fails the CRC check or sync was lost in which case the history count will be set to zero. If the frame is a NIF, a NAK is placed in the ACK/NAK list 36 and the history count is set to zero. Each ACK/NAK list entry includes the history count.

If an ACK is entered in the list, the history count for this entry will be one more than that in the previous entry. Once the count reaches sixteen, it is no longer incremented. If the entry being made is for a NAK, then the history count is reset to zero. If the ACK/NAK list 108 is full, the entry is dropped but the history count is updated as required. At some appropriate interval, the receive list 112 is updated. If the oldest entry on the list was just received, having been previously incorrectly received, then that frame and all subsequently received (i.e., good) data blocks above it up to the next not-received block is released to destination device 14.

STATION 16—TRANSMIT ACTIONS

At some interval after the receiver 16R places its condition response (ACK/NAK/BO) in the ACK/NAK list 36, the transmitter section 16T will use this entry to make up a transmit header. As part of the process, the transmitter section 16T will pull the oldest entry from the ACK/NAK list 36 and insert the appropriate response condition and ACK sequence number into the header location. If the list is empty, it will insert a NOP response condition and will leave the history count and sequence number fields blank.

STATION 12—RECEIVE ACTIONS

The first station receiver 12R receives the frame transmitted by the second station transmitter 16T. As explained above for the second station, the receiver 12R receives the response conditions and associated data from the header and enters it in the received ACK/NAK list 90 for use by the transmitter 12T in updating its transmit list 84. The following conditions and responses are made upon receiving a frame at the first station 12. If the frame is bad, the receiver 12R places an entry indicating "bad" into the ACK/NAK list 90. If the frame is good, the condition response and all associated data is pulled from the header and placed in the ACK/NAK list 90. The entry is marked as "good".

The received ACK/NAK list 90 is examined by the transmitter section 12T. The list entries are used to determine if retransmission, etc., should be made. The loop around the system is essentially synchronous, i.e., with every frame sent, one frame should be received. Thus, the next ACK N(r) in the received ACK/NAK list 90 will typically be for the sequence number of the oldest (bottom) entry in the transmit list 84. Since frame slips can occur for various reasons, allowance must be made for sequence numbers not matching. The handling of various possible cases is shown below by response condition.

ACK N(r)—If N(r) matches the bottom entry on the transmit list 84, the data block is freed for reuse. If the entry had a copy count of other than 1 (i.e. indicating that multiple copies were sent), mark the entry as ACK'd and release the data block and wait for the last copy before dropping the entry.

ACK N(r)—If N(r) does not match, the list is searched upward for up to ten entries. If a match is found, then apply the history count and mark all the intervening un ACK'd entries as retransmitted set their copy count to three, and place them on the retransmit request list 2. Drop the entries and then free the data blocks for all entries implied ACK'd by the history count.

NAK Set the copy count to three, mark as retransmitted and put the entry on the retransmit request list 82. If the entry is an NIF, then decrement the copy count for each NAK received. When the count reaches zero, drop the entry.

BO Put the entry on the retransmit request list 82.

NOP Do nothing.

BAD If a sequence of eleven "bad" frames or received NAK's is found before an ACK is received, then begin reinitialization recovery as will be explained below.

If a situation occurs wherein a frame which requires retransmission is marked as having been transmitted twice before, then a reinitialization recovery must also be performed. This is to preclude the possibility of a sequence number being assigned to two blocks simultaneously.

STATION 12—TRANSMIT ACTIONS

At the header former unit 80, the retransmit request list 82 now contains entries. The block associated with each entry will be transmitted the number of times shown in a copy count using a newly generated header each time. When "count" copies of the block have been sent, the entry is placed at the top of the transmit list 84 and the next entry in the retransmit request list 82 is processed. If there are no entries in the retransmit request list 82 or new data list 32, then NIF's are sent at each frame time. An entry for a NIF is made at the top of the transmit list 84 and the count of the number of NIF's transmitted is maintained in it until the next entry for a IF is added to the top of the list.

Figure 4:
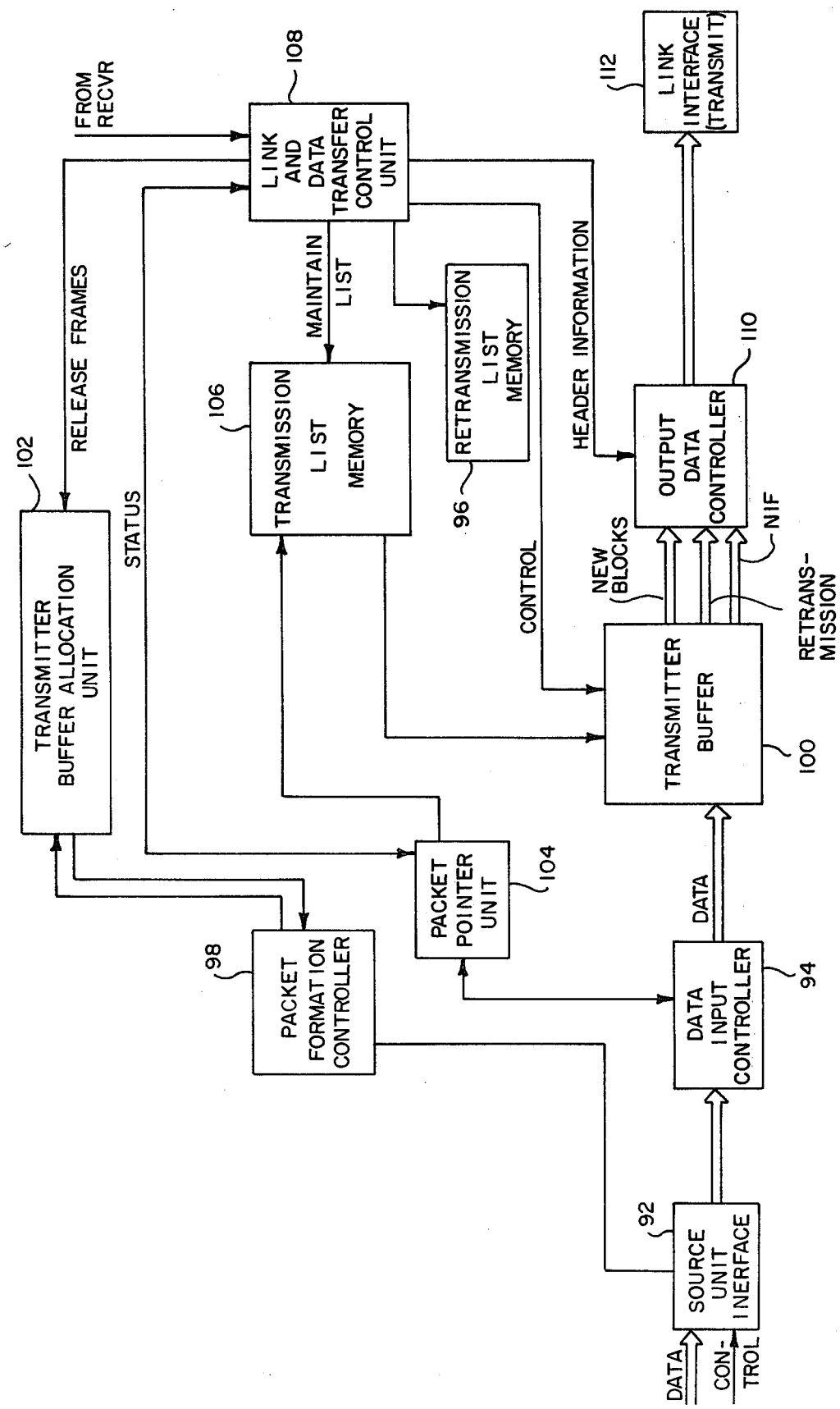
FIG. 4 is a block diagram of the transmitter portion of each station shown in FIG. 1.

A block diagram of the transmitter section is shown in FIG. 4. The packet formation controller 98 obtains control of data blocks from the transmitter buffer allocation unit, 102, then enables the source unit interface adapter to accept a data record from the source device. The data input controller 94 divides this input record and places it into the data blocks obtained by the packet formation controller and then adds a packet header to mark the end of that data record. The packet pointer unit 104 maintains a list of blocks which are filled and ready for transmission.

The link and data transfer control unit 108 uses the ACK, NAK, etc., information from the receive section to update the transmit list and determine if data blocks must be retransmitted. Any block requiring retransmission will be marked by a pointer in the retransmission list memory, 96. It will then prepare to transmit a frame requiring retransmission, a new data block, or a NIF, in that order of priority. If a new data block from the packet pointer unit, 104 is selected, a sequence number is assigned to it and a pointer to it is entered into the transmission list memory, 106. In all cases a frame header is then formed for the block by the link and data transfer control unit which then directs the output data controller 110 to transmit this header and the associated data block or dummy data (for a NIF). The output data controller outputs the sync code, header data block and CRC to the communications link through the link interface, 112. When the link and data transfer control unit determines that a data block has been correctly received at the remote site, it removes the pointer to that data block from the transmit list, 106, and releases control of the block back to the transmitter buffer allocation unit, 102.

Figure 6:
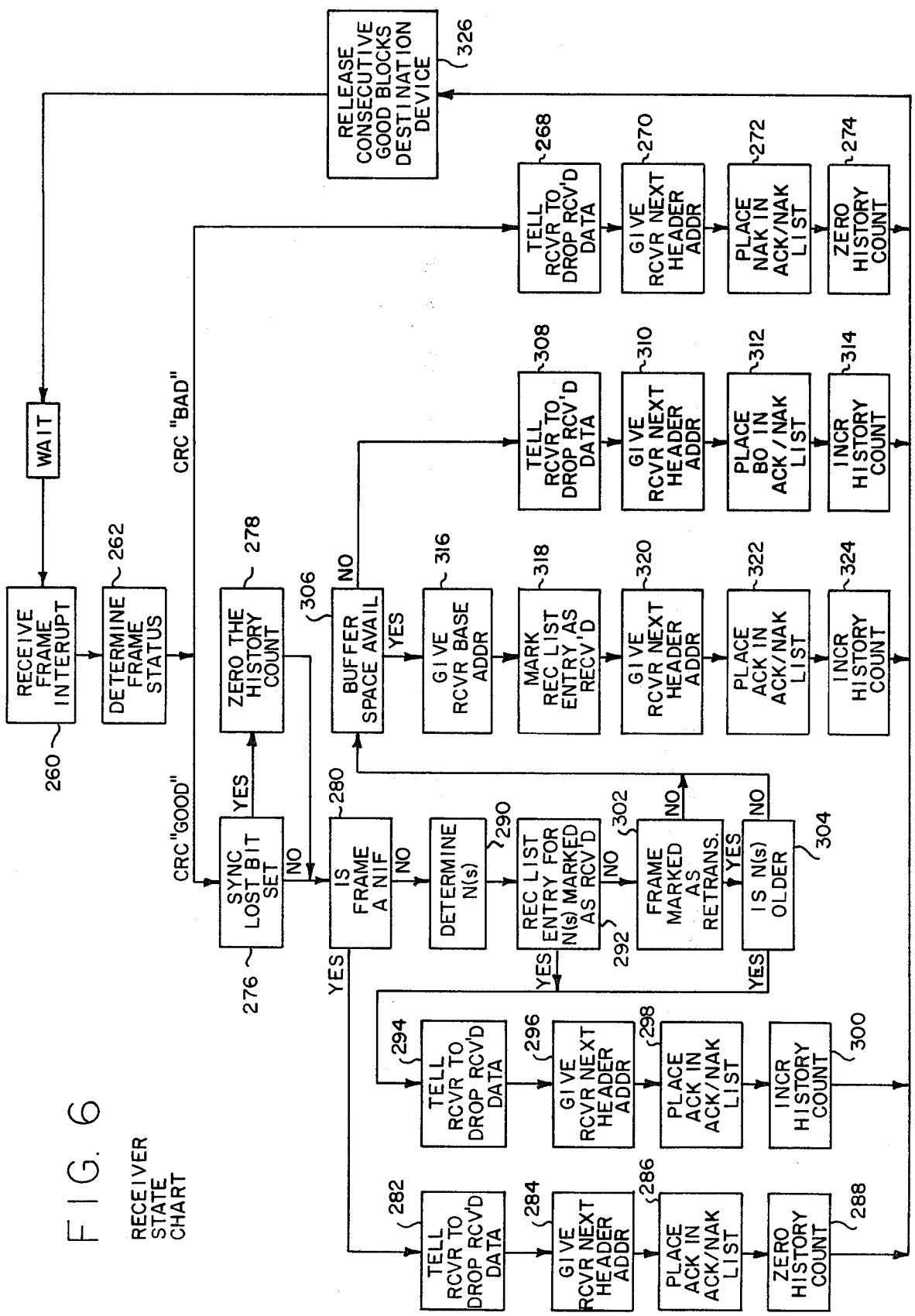
FIG. 6 is a functional flow diagram showing processing of received frames.

At the receive side, shown in FIG. 6, the link and data transfer control unit 130 obtains control of data blocks from the receiver buffer allocation unit, 132, and associates the data blocks with specific sequence numbers and produces a corresponding entry to that block in the receive list memory, 134.

When a frame has been received, as determined by the frame processor, 122, the frame processor determines if the frame is bad and then notifies the link and data transfer unit, 130, providing both the frame status and the frame header. The link and data transfer control unit, 130, will pull the operator communication character and determine how to process the received data block. If the frame is bad, it will be discarded. If the frame is good, the link and data transfer control unit, 130, will reference the receive list memory, 134. If the receive list memory, 134, shows that sequence number has been received, the block will be discarded. If there is no data block associated with that sequence number, the block will be discarded as a buffer overflow. Otherwise, the block will be transferred from the one block buffer, 124, into the preassigned data block in the receive buffer, 126. The link and data transfer control unit will make an entry for this frame in the ACK/NAK list, 145.

On a periodic basis, the block release control unit will inspect the receive list memory, 134, to determine if the next sequential block has been correctly received and, if so, will remove this block from the receive list memory and pass control of the block to the packet formation unit 142. The packet formation unit will hold the pointers to these blocks until all blocks containing the next record are in its control. At this point, it will cause the output data controller, 136, to transfer these blocks through the receive unit interface adapter, 140, to the receiving device. When the record has been accepted by the receiving device, the packet formation unit, 142, will return control of the data blocks to the receiver buffer allocation unit, 132.

A detailed state chart is shown in FIG. 6 which describes the processing performed by the receiver section 16R of FIG. 3. After a frame interrupt is received (step 260) the status of the frame is determined (step 262); i.e. an error check is performed to determine whether the received frame passes the CRC error check. If the CRC error check is bad, the receiver drops the received data (step 268) and the receiver is provided with the next header address (step 270), a NAK is placed in the ACK/NAK list (step 272) and the history count is reset to zero (step 274).

If the CRC error check is good, a check is made to determine if a sync lost bit is in a set condition (step 276). If it is, then the history count is zeroed (step 278), thereby indicating that the prior received frame had an error in its synchronization word. The frame is then examined to determine whether it is a noninformation (NIF) (step 280). If it is, then the receiver drops the receive data (step 282), and the next received header is provided (step 284), a NAK is then placed in the ACK/NAK list (step 286), and the history count is zeroed (step 288). If the frame is not a NIF then the sequence number is read (step 290) and the receive list entries are checked to see if that particular sequence number is marked as already having been received (step 292). If that sequence number has already been received, then the receiver drops the receive data (step 294) and the receiver is provided the next header (step) 296). An ACK is then placed in the ACK/NAK list (step 298) and the history count is incremented (step 300). However, if the receive list does not show that the sequence number has been received then that frame is checked (step 302) to determine if it has been marked as retransmitted. If it has been so marked then a check is made (step 304) to determine if that sequence number is older than the last sequence number released to the destination device. If it is older than the last sequence number released, then the receiver drops the receive data as previously explained (step 294). However, if it is not older, then a check is made to determine if buffer storage space is available (step 306). If buffer storage is not available, the receiver drops the receive data (step 308), the receiver is given the next header address (step 310), a buffer overflow (BO) indication is placed in the ACK/NAK list (step 312) and the history count is incremented (step 314).

However, if buffer space is available, the receiver is given the base address of the block when the data is to be written (step 316), and the receive list is marked as having received that sequence number (step 318). The receiver is given the next header (step 320), an ACK is placed in the ACK/NAK list (step 322) and the history count is incremented by one (step 324). The receive list is continually monitored so that good data blocks are released to the destination device (step 326).

Figure 7A:
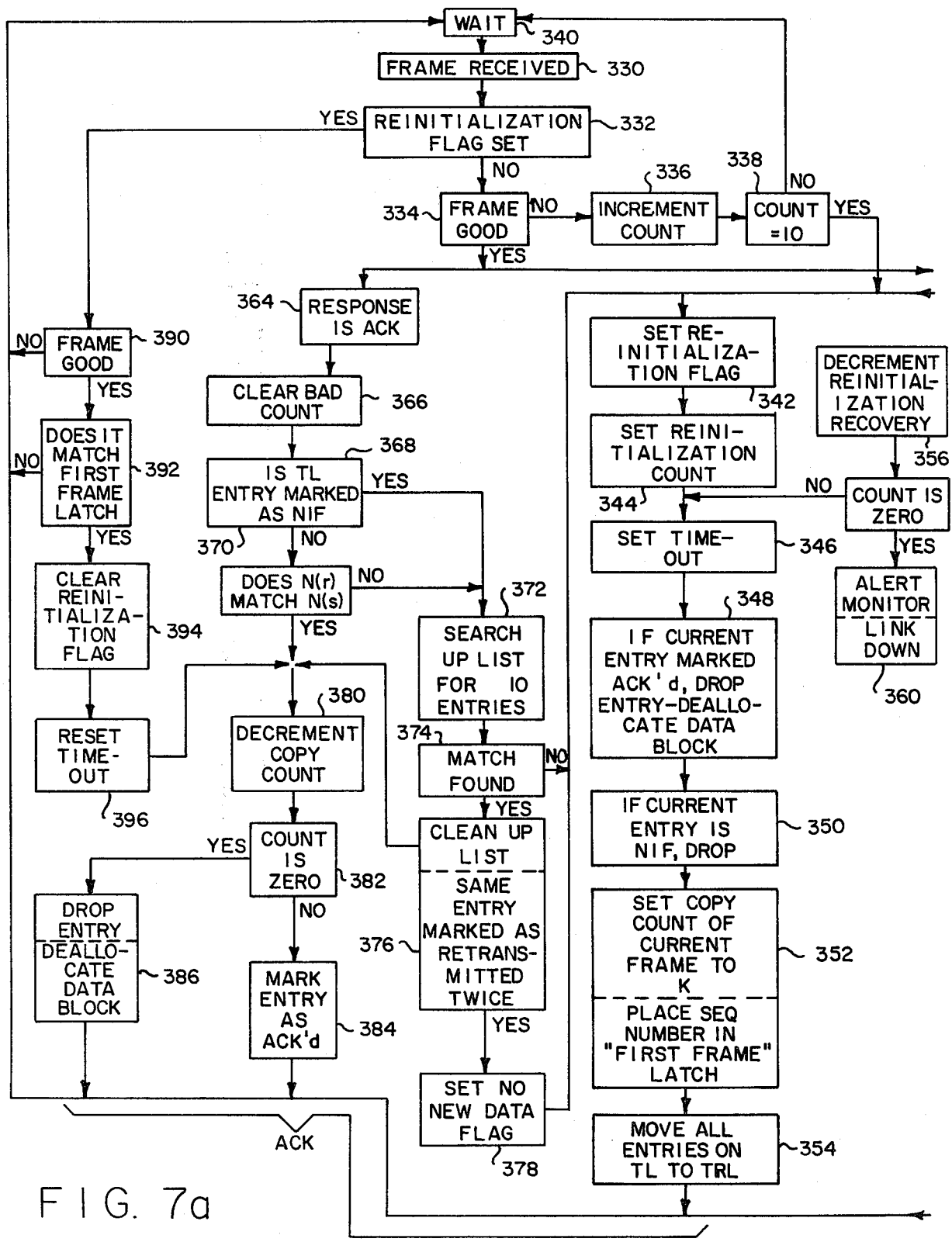
FIG. 7 is a functional flow diagram showing processing of the transmit list.
Figure 7B:
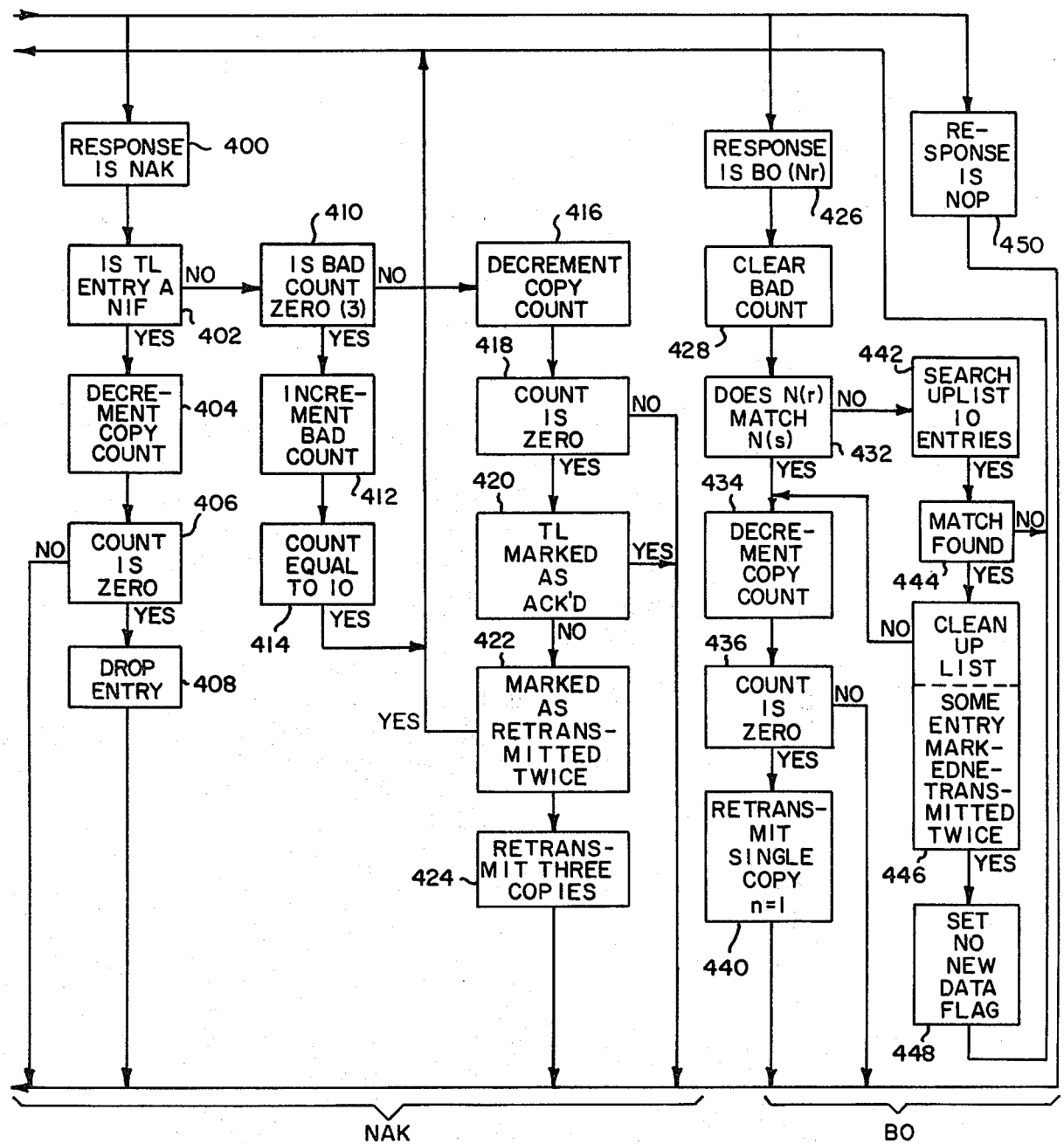

A detailed state chart is shown in FIG. 7 which describes the processing performed by the transmitter section 12T of FIG. 3. Here, a frame is received in step 330 and a check is then made as to whether the reinitialization flag is set (step 332). The incoming receive frame is then checked to see whether it is good (step 334). If the frame is not good, a bad frame counter is incremented (step 336) and a determination made as to whether the bad frame count is equal to 10 (step 338). If the count does not equal 10 the system returns to the wait mode until the next frame is received. If the count does equal 10, thereby indicating that the last 10 frames were incorrectly received and thus that the system was probably out of synchronization, a reinitialization sequence is then initiated. Although 10 has been chosen as the number of bad frames required to initiate a reinitialization, it should be appreciated that any other number could have been selected.

Initiation of the reinitialization sequence involves setting a reinitialization flag (step 342) and a reinitialization count (step 344). A time-out count is also set (step 346). If the current entry at the bottom of the transmit list is marked ACK'd, the entry is dropped the data block is freed (step 348). If the current entry is a NIF, the entry is dropped (step 350), the copy count of the current frame is set to K where K can be any suitably selected number (typically 3) and the sequence number is placed in a first frame latch (step 352). All entries on the transmit list are then moved to the retransmit request list (step 354). Thus, this reinitialization sequence moves all nonpreviously ACK'd block identification numbers from the transmit list to the retransmit request list to be retransmitted.

If the time-out signal set in step 346 expires, then the reinitialization count is decremented (step 356). If the count is not zero as determined in step 358 then the reinitialization sequence is continued. If the count is zero then some problem exists with the link and an operator alert is activated (step 360). To summarize the reinitialization recovery, single copies of all un-ACK'd frames are retransmitted until synchronization is regained or a predetermined time out interval is introduced.

If the received data frame contains an ACK as determined in step 364, then the bad count pointer is cleared (step 366) and the oldest (bottom) transmit list entry is checked (step 368) to determine if it is a NIF. If it is not a NIF then a check is made (step 370) to determine if the ACK sequence number N(r) matches the send sequence number N(s) on the transmit list. If the transmit list entry is marked as a (NIF) or if the N(r) does not match N(s), then a search of the transmit list for up to ten entries is made (step 372). If a match is not found (step 374), then the reinitialization flag is set (step 342) and the reinitialization recovery sequence previously described is initiated. If a match is found then the transmit list is accordingly corrected (step 376). However, if the same entry is marked as having been retransmitted twice, then a no-new data flag is set (step 378) and the reinitialization flag (342) is set and the reinitialization sequence again is initiated. No new data is allowed since it could be assigned a sequence number the same as the one marked as having been retransmitted twice. When N(r) matches N(s) either immediately or within the search (step 372), then the copy count of that entry is decremented (step 380). If the count is not zero (step 382) the entry is marked as ACK'd (step 384). If the copy count is zero then the entry is dropped (step 386) and the data block is deallocated.

Referring again to step 332, if the reinitialization flag is set at the time of a frame being received (step 320), a check is made to determine if the frame is good (step 390). If the frame is not good then the system waits for the next frame (step 340). If the frame is good, then a check is made to determine if it matches a first frame latch (step 392). If it does not, then the system waits for the next frame. If it does match the first frame latch, then the reinitialization flag is cleared (step 394) and the time out circuit is reset (step 396) and the copy count is again decremented (step 380). Thus, receipt of a good frame matching the frame transmitted during the reinitialization recovery sequence clears a reinitialization flag set in step 342 and allows the system to then process received frames in the normal manner described above.

If the received frame contains a NAK as determined in step 400, then step 402 is utilized to determine if the transmit list entry contains a NIF. If it does, the copy count is decremented by one (step 404). If the copy count is zero (step 406), then the entry is dropped (step 408) and the system returns for the next frame. Similarly, if the copy count is zero, the system returns directly to the wait mode (step 340).

Referring back to step 402, if the response is a NAK and transmit list entry is not a NIF then the system (step 410) determines if the bad count is zero. As previously explained, the bad count is incremented each time a NAK is received or when a frame is incorrectly received; i.e. the CRC check is bad. After receipt of 11 NAK's or incorrect frames, reinitialization recovery is initiated. If 11 NAK's are received consecutively, this indicates the remote station has lost synchronization. An ACK or buffer overflow (BO) resets the bad count to zero. Thus, in step 412, the bad count is incremented by one, and if the count equals 10 (step 414) then reinitialization recovery is initiated.

If the bad count as determined in step 410 is not zero, then the copy count of the oldest (bottom entry in the transmit list) is decremented by one (step 416). If the count is not zero (step 418) after having been decremented by one, then the system waits for the next frame. If the count is zero after having been decremented by one, then the transmit list is checked (step 420) to see if the NAK frame had been previously marked as ACK'd. If it had, then the system returns to the wait mode in step 340. If the frame has not been previously marked as ACK'd then (step 422) a check is made to determine if the frame had been retransmitted twice. If it had, then reinitialization recovery is initiated. If it had not been then the frame is retransmitted three times (step 424).

If the receive frame indicates a buffer overflow (step 426), then the bad count entry is cleared (step 428). A check is made to see if N(r) matches N(s) (step 432). If it does, then the copy count is decremented by one (step 434). If the count is not zero, then the system returns to the wait mode (step 440). If it is zero, then a single copy is retransmitted (step 440).

If the sequence number received does not match the oldest (bottom) entry on the transmit list (step 432), then the next ten entries on the transmit list are searched (step 442). If a match is not found (step 444), then reinitialization recovery is initiated. If a match is found, and some entry passed in the search is marked as transmitted twice (step 446), then the "No new data flag" is set in step 448 and the system returns to reinitialization recovery as explained.

If the frame contains a NOP response (step 450), then the system takes no action and awaits the next frame.

By way of summary, by searching up the transmit list for a match between N(r) and N(s), several entries on the list may have been skipped. In order to determine whether those skipped entries were correctly received, the history count in the data frame containing N(r) is examined. The history count may demonstrate that intervening entries can be dropped. For intervening entries, the following actions occur depending upon the type of frame indicated. If the entry is for a NIF the entry is dropped (step 408). If an intervening entry is within "history count" frames containing the current ACK (steps 376 and 446), it is implied as ACK'd, and the entry is dropped and the data space deallocated (step 386). If the entry is for a nonretransmitted information frame which was not implied to be ACK'd (i.e., not within "history count" frames), the copy count is set to three and the entry is moved from the transmit list to the retransmit request list (step 424). If the entry is for a retransmit information frame which was not implied as ACK'd, then the entry is remarked as retransmitted a second time, the copy count is set to three and the entry is moved from the transmit list and placed on the retransmit request list. If the entry is marked as retransmitted a second time and is NAK'd, all processing stops and reinitialization will begin (step 422). Referring to step 352, when reinitialization recovery begins, K copies of the first frame is transmitted and the receiver ignores all responses until it finds an acknowledgement for that first frame.

Figure 8:
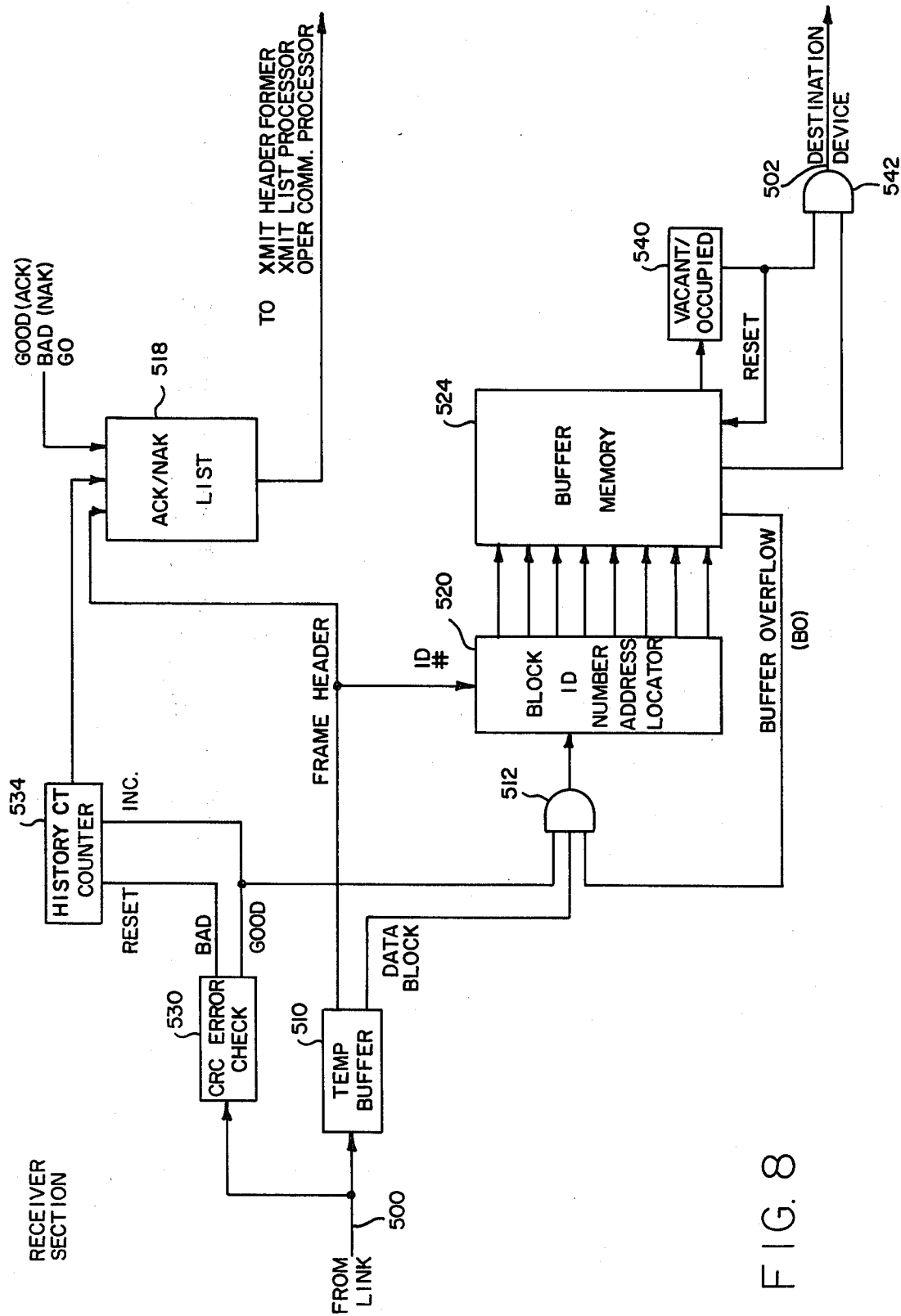
FIG. 8 is a schematic block diagram depicting one implementaion of a station receiver section.
Figure 9:
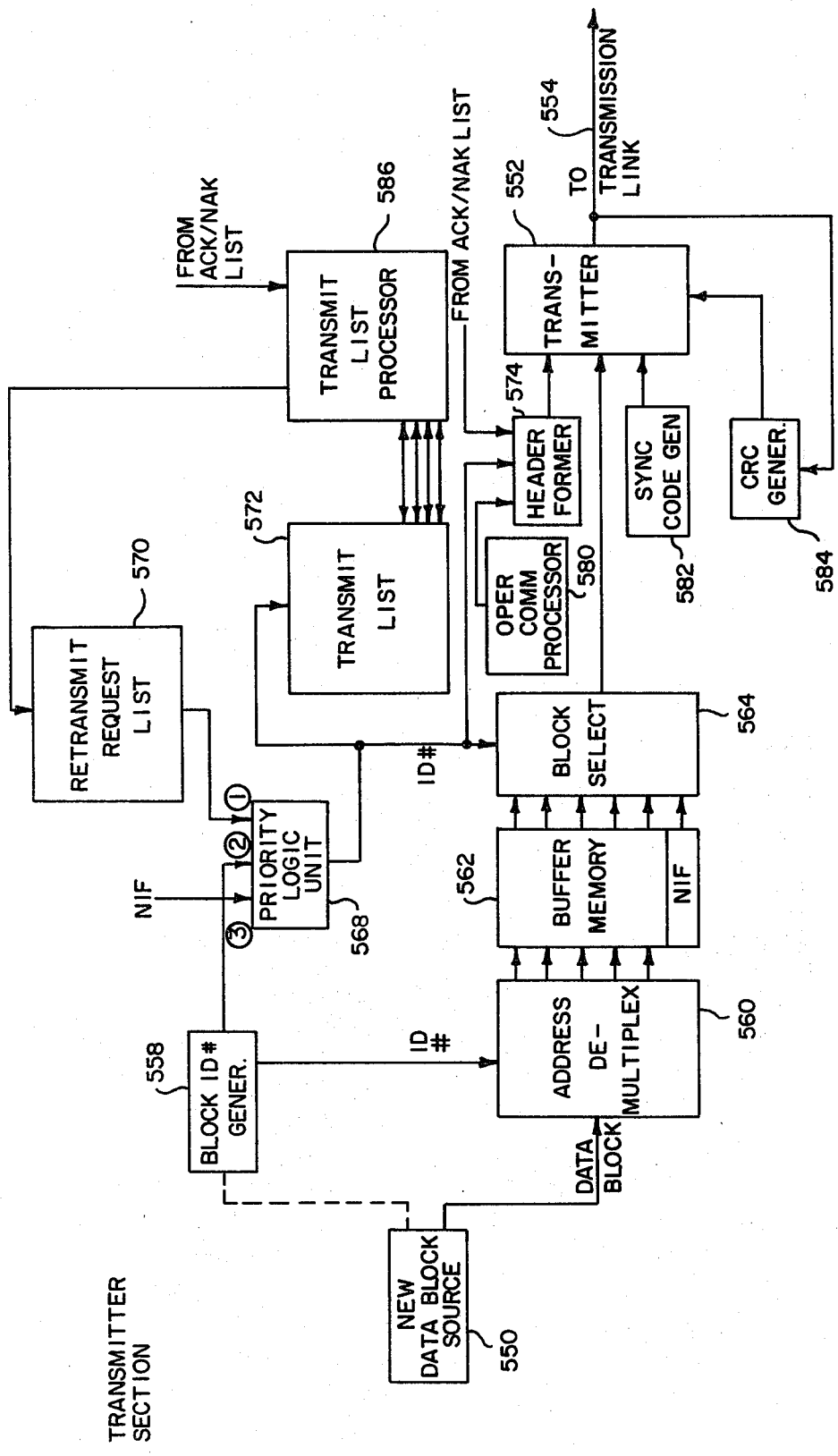
FIG. 9 is a schematic block diagram depicting one implementation of a station transmitter section.

The aforedescribed flow diagrams of FIGS. 6 and 7 describe the details of a system in accordance with the invention which, as should be readily apparent to one skilled in the art, can be readily implemented either in hardware or software or a combination of both. Attention is now directed to FIGS. 8 and 9 which depict schematic block diagrams of an exemplary implementation of the major portions of the system defined by FIGS. 6 and 7.

FIG. 8 depicts the receiver section of a station for responding to a bit stream received over the transmission link 500 to release data blocks, in the same sequence in which they are originally transmitted, to a destination device via output terminal 502.

The receiver section includes a temporary buffer unit 510 which receives and temporarily stores a full data frame. The information field or data block of the data frame is coupled to the input of gating logic 512. The header field of the data frame is steered from the temporary buffer 510 to an ACK/NAK list memory 518. The list 518 is preferably organized as a first in, first out (FIFO) memory and it will be assumed that new entries are inserted at the top of the list and shift downwardly so that the oldest entry will be at the bottom. The frame header derived from the buffer unit 510 is also applied to the address input of a block identification number address locator 520. The output of aforementioned gating logic 512 supplies the data input to the address locator 520. The address locator 520 is associated with a buffer memory 524 which is organized as a modified FIFO memory. That is, the buffer memory 524 normally operates as a FIFO memory with new entries being entered in the topmost location and then successively shifting down through the memory locations. The FIFO memory 524 is, however, modified in that locations can be left vacant if a received frame is not good and a data block can be later inserted into a vacant location, as defined by the block identification number, applied to the address locator 520.

The receiver section of FIG. 8 also includes a CRC error check unit 530 which examines each data frame as it is received from the transmission link and determines whether the frame is good or bad. In accordance with what has been previously described, it should be recognized that if a received frame is good, the history count counter 534 will be incremented. If the frame is bad, the history counter 534 will be reset.

Entries in the ACK/NAK list, previously defined, include the frame header (including the block identification number), the history count, and status bits indicating whether the received frame was good, whether it was bad, or whether the buffer memory 524 has overflowed. As is depicted in FIG. 8, the frame header is entered into the ACK/NAK list 518 from the temporary buffer 510. The history count is entered into the list 518 from the history counter 534. The good (ACK) or bad (NAK) frame indicator is derived from the CRC error check unit 530. The buffer overflow (BO) indication is derived from the buffer memory 524 when all of the locations of the buffer memory are occupied and intermediate locations have been left vacant for missing data blocks.

The buffer overflow indication is also applied to the input of the gating logic 512. Additionally, an input to the gating logic 512 is derived from the good output terminal of the CRC error check unit 530.

The vacant/occupied logic unit 540 is responsive to the contents of the oldest (bottom) location in the buffer memory 524. If the bottom location is occupied, the vacant/occupied logic unit 540 enables gate 542 to release the data block therefrom to a destination device. Additionally, the logic unit 540 resets a status bit to clear the bottom location and enable it to accept the next sequential data block.

In the operation of FIG. 8, a data frame is received from the transmission link and entered into the temporary buffer 510. If the error check unit 530 indicates that the frame is good, and if there is space in the buffer memory 524, the data block from the received information frame will be gated through logic 512 and entered into the buffer memory 524. Normally, each new data block will be entered into the topmost location of the FIFO buffer memory, and will then successively shift down to the oldest block location. If a bad frame is received, its associated data block will not be entered into the buffer memory 524 but, nevertheless, the contents of the buffer memory 524 will be shifted down leaving a vacant location for the frame received bad. Subsequently, when the frame is retransmitted and is received good, its block identification number will cause the address locator 520 to enter it into its vacant sequential location in the buffer memory 524. If the bottom or oldest location in the memory 524 does not contain a good data block, i.e., the location is vacant, no further data blocks will be released by the logic unit 540 via the gate 542 until that location is filled as a consequence of a good retransmission of the frame containing the data block. Thus, data blocks are released to the destination device only in the sequence in which they were originally transmitted. Thus, the buffer memory 524 can fill up while waiting for a good retransmission of the data block and in such a case a buffer overflow (BO) signal will be generated to indicate that the buffer memory cannot accept new data blocks.

As data frames are received, the ACK/NAK list is formulated. The oldest entry in the ACK/NAK list is pulled from the list and incorporated into a data frame transmitted by the transmitter section of the station containing the receiver section of FIG. 8. Thus, FIG. 8 depicts that the oldest entry in the ACK/NAK list is provided to the transmitter section header former for transmission over the link. It is also provided to the transmit list processor of the transmitter section of the same station and used to determine what entries can be dropped from the transmit list. It is also provided to an operator communications processor which pulls out the operator communication character contained within the received data frame.

Attention is now directed to FIG. 9 which depicts the transmitter section of each station. The transmitter section of FIG. 9 accepts new data blocks from a source device 550 and assembles data frames for transmission over the link via the transmitter 552 having an output terminal 554.

Referring now more particularly to FIG. 9, as the new data block source 550 supplies data blocks, it causes the block identification generator to generate, in numerical sequence, block identification numbers. Each new data block is supplied to the address demultiplexer 560 associated with a buffer memory 562. The associated block identification number locates the data block in the buffer memory 562 so that the data block can be accessed utilizing the block identification number. Data blocks are retrieved from the buffer memory 562 by a block select unit 564 which responds to identification numbers supplied to it from a priority logic unit 568. As has been previously described, the priority logic unit 567 gives highest priority to retransmission requests and a second level priority to the transmission of new data blocks, Thus, the output of the block identification number generator 558 is depicted as being applied to the number 2 input terminal of the priority logic unit 20 whereas the output of the retransmit request 570 is depicted as being applied to the number 1 input terminal of the priority logic unit. The logic unit 568 supplies an output including a block identification number which is entered into the aforementioned transmit list. The transmit list is a FIFO memory such that new items are entered at the top and then flow to the bottom of the list.

The output of the priority logic unit is also supplied to the block select unit 564 which accesses a data block from the buffer memory 562. The accessed data blocks are supplied to the transmitter 552 for incorporation into a data frame. Additionally, the output of the priority logic unit 568 is applied to a header former unit 574 which also receives entries from the ACK/NAK list (FIG. 8) and from an operator communication processor 580. The output of the header former 574 is also supplied to the transmitter 552 for incorporation into the data frame. Similarly, a sync code generator 582 and a CRC generator 584 supply the aforementioned information to the transmitter 552 for incorporation into a data frame.

In addition to forming data frames containing new data blocks, as has been thus far described in connection with FIG. 9, the transmitter section must attend to keeping track of frames which have been transmitted and whose receipt by the destination station has not been confirmed. The transmit list 572 contains entries identifying all data frames which have been transmitted and whose receipt has not been confirmed. It will be recalled that receipt of a data frame by the destination station can be confirmed either by a positive acknowledgement (ACK) received from the destination station or by utilization of the history count which may indicate that one or more earlier data frames, though not positively acknowledged, was indeed correctly received by the destination station.

A transmit list processor 586 is provided which responds to the ACK/NAK list (in the receiver section of the same station) to determine whether an entry on the transmit list can be dropped therefrom or must be moved to the retransmit request list 570. The retransmit request list is also preferably organized as a FIFO memory with entries from the transmit list 572 being entered into the top location of the list 570, and then shifted down.

In typical use, the transmit list processor 586 will receive an entry from the ACK/NAK list containing an identification number and a positive acknowledgement (ACK). Normally this will correspond to the oldest entry in the transmit line which can then be dropped and its associated location in the buffer memory can be released. If, however, the processor receives a NAK, then it cannot at that point drop an entry from the transmit list. Subsequent receipt of an ACK with a history count covering multiple frames causes the processor 586 to search up the transmit list 572 to locate the then acknowledged frame. As has been previously described, older frames within the "history count" can then be dropped from the list 572 and the related locations in the buffer memory 572 can be released.

It should also be mentioned that at certain points in time, the retransmit request list 570 may be empty and there may be no new data blocks available from source 550 for transmission. In this case, the priority logic unit 568 generates a noninformation frame (NIF) whose dummy information field can be derived from a preestablished location in the buffer memory 562.

From the foregoing, it should now be recognized that an improved method and system have been disclosed herein for communicating large amounts of user data over long propagation delay paths so as to assure a high throughput of data by minimizing the amount of retransmissions required. Although a preferred exemplary embodiment has been disclosed herein, it will be recognized by those skilled in the art that various alternatives and equivalents are available, all within the scope of the invention as claimed.

What is claimed is:

1. A system for transferring user data from a first station source to a second station destination via a communication path, said system comprising:

a transmitter connected to said first station source for transmitting data frames, each data frame comprising a bit stream defining an identification number, said identification number identifying the data frame and said bit stream including an information field for accommodating a block of user data originally supplied by said first station source device, said first station transmitter including a transmit list means for storing a list of identification numbers, related to specific ones of said previously transmitted data frames, said first station including buffer means for storing the said data blocks contained in the data frames previously transmitted and identified by said identification numbers stored in said transmit list means, a receiver means located at said second station and coupled into said path for receiving data from said first station transmitter, said receiver means at said second station including means for receiving said data frames transmitted by said first station transmitter and for analyzing said received data frames to determine whether the received data frames need to be retransmitted, said second station including transmitter means for transmitting data frames each comprising a bit stream, said second station transmitter bit stream containing acknowledgement data, said acknowledgement data including an identification number identifying the particular one of said data frames received from said first station transmitter and said second station transmitter means inserting in its said acknowledgement data, an acknowledgement code indicating whether or not the respective data frame should be repeated or not, and said first station including a receiver means coupled to said path, said first station receiver means receiving said second station transmitted frames each comprising said bit stream, said first station including processor means connected to said first station receiver means and responsive to the acknowledgement data in said bit stream from said second station transmitting means and to said identification numbers in said transmit list for selectively retransmitting said data blocks identified thereby.

2. The system of claim 1 wherein said first station transmitter means and said second station transmitter means each transmit frames at substantially the same rate and wherein said first station frame contains a different number of bits than said second station frame.

3. The system of claim 1 including a destination device at said first station and a source device at said second station and wherein said first station transmitting means data frames define acknowledgement information including an identification number identifying a received data frame transmitted from said second station and an acknowledgement code indicating whether the received data frame should be retransmitted.

4. A system for transferring data supplied from a source device at a first station to a destination device at a second station via a propagation path, said propagation path including a satellite repeater and said system comprising a first station transmitter means for transmitting data over said path, at fixed intervals, said data containing a header field including an identification number identifying the data frame and an information field for accommodating user data supplied by said source device, said first station including transmit means for storing a list of identification numbers of previously transmitted data frames, said first station including buffer means connected to said transmit means for storing the contents of the information fields contained in the data frames identified by said transmit list means, said second station receiver means coupled to said path for receiving the transmission from said first station transmitter, said second station receiver means including means responsive to said received data for determining whether the data frames are good or bad, said second station including transmitter means for transmitting data frames over said path at fixed intervals, said data frames containing a header field including an identification number and an acknowledgement code indicating whether the received data frame was good or bad, and said first station including a processor means connected to said propagation path and receiving said data frames transmitted by said second station, said processor means responsive to said identification number of said received data frame and said respective acknowledgement code for determining whether to delete a related identification number from said transmit list or retransmit the contents of the said related information fields stored in the said buffer means.

5. The system of claim 4 wherein said second station receiver means includes means for storing a history count related to the number of successively received good frames and said second station transmitter means being connected to said history count means for receiving said history count and incorporating said history count in said data frames transmitted by said second station.

6. The system of claim 4 wherein said first station transmitter means includes a means responsive to said source device for incorporating data supplied from said source device into said information field or in the absence of data supplied by said source device, incorporating filler information into said information field and said first station transmitter header field including a code indicating whether said information field contains user data or filler information.

7. The system of claim 4 including operator communication means coupled to said first station transmitter means for incorporating operator communication characters in said data frames and operator communication processor means coupled to said second station receiver means for responding to said operator communications characters.

8. The system of claim 4 including the retransmit list means at said first station for storing a list of identification numbers and wherein said processor means is connected to said transmit list and said retransmit list means and selectively transfers entries from said transmit list means to said retransmit list means.

9. The system of claim 4 wherein said processor means is connected to said transmit list and said processor means is responsive to said acknowledgement codes indicating a data frame was received good for deleting said identification numbers from said transmit list.

10. The system of claim 9 wherein said second station receiver means includes count means for forming a history count representing the number of successively received good data frames and said second station transmitter means being connected to said history count means for inserting said history count into said data frames transmitted by said second station transmitter, and said processor means deleting a plurality of identification numbers from said transmit list equal to said history count.

11. The system of claim 10 wherein said plurality of identification numbers sequentially precede in the transmit list, the identification number contained in a data frame also containing the history count.

12. A method of transferring large amounts of user data supplied by a source device at a first station to a destination device at a second station comprising the steps of;

transmitting successive data frames from said first station each comprising a bit stream defining a frame sequence number and an information field accommodating a large block of data originally supplied by said source device, storing a list of frame sequence numbers identifying recently transmitted data frames and the data blocks associated with such stored framed sequence numbers, determining at said second station whether a data frame received thereat is good, transmitting successive data frames from said second station, each comprising a bit stream containing acknowledgement information including a frame sequence number identifying a data frame received from said first station and an acknowledgement code indicating whether that received data frame was good, and retransmitting from said first station selected ones of said stored data blocks depending upon whether the frames received at said first station indicates the data frames contained in the data blocks were good and as received at said second station.

13. The method of claim 12 wherein said step of determining at said second station whether a data frame received thereat is good includes the step of forming a history count representing the number of successively received good data frames and said step of transmitting successive data frames from said second station includes the step of transmitting said history count within said data frames.

14. The method of claim 13 wherein said step of retransmitting includes the step of deleting a plurality of identification numbers from said stored list of framed sequence numbers related to said history count.

* * * * *